United States Patent [19]
Ohtake

[11] Patent Number: 5,775,790
[45] Date of Patent: Jul. 7, 1998

[54] ILLUMINATING OPTICAL SYSTEM

[75] Inventor: Motoyuki Ohtake, Kawasaki, Japan

[73] Assignee: Nikon Corporation, Tokyo, Japan

[21] Appl. No.: 684,476

[22] Filed: Jul. 19, 1996

[30]      Foreign Application Priority Data

Jul. 21, 1995   [JP]   Japan .................. 7-207604

[51] Int. Cl.⁶ .................................................. G03B 15/02
[52] U.S. Cl. ................. 362/18; 362/282; 362/287; 362/326; 362/328
[58] Field of Search ........................... 362/161, 181, 362/282, 287, 319, 326, 328

[56]           References Cited

U.S. PATENT DOCUMENTS 4,991,063   2/1991   Stoneham .................. 362/18
5,050,044   9/1991   Shibayama ................ 362/18

FOREIGN PATENT DOCUMENTS 6-332044   12/1994   Japan .

*Primary Examiner*—Stephen F. Husar
*Attorney, Agent, or Firm*—Shapiro and Shapiro

[57]           ABSTRACT

An illuminating optical system including a light emitting device for supplying illuminating light, a directing member for directing the light beam from the light emitting device by refracting action, and a moving device for moving at least one of the light emitting device and the directing member in a direction differing from the direction of the optical axis of the directing member and varying the spacing between the light emitting device and the directing member to thereby vary the illumination range at a predetermined distance.

10 Claims, 14 Drawing Sheets

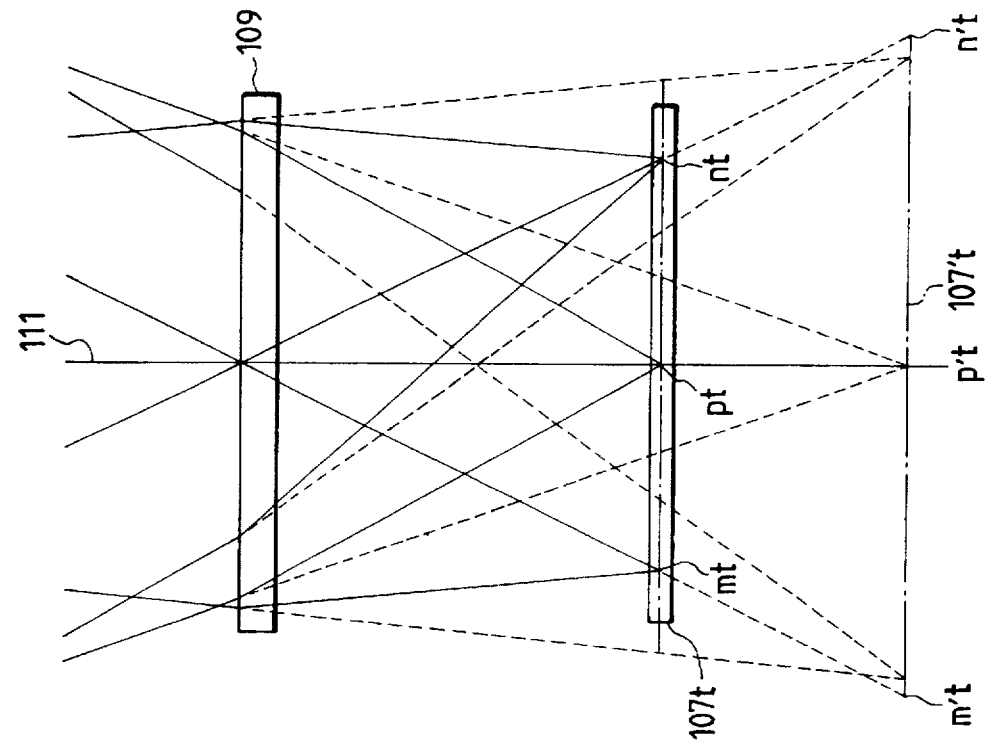
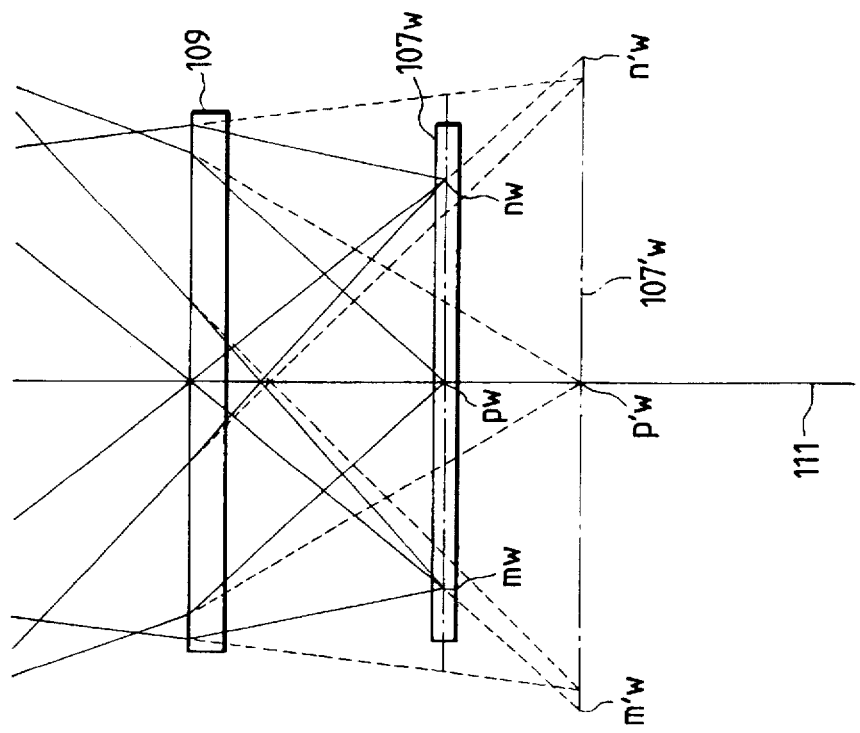

ILLUMINATING OPTICAL SYSTEM

BACKGROUND OF THE INVENTION

1. Field of the Invention

This invention relates to an illuminating optical system, and particularly to an illuminating optical system for illuminating a predetermined range which is suitable for a camera or the like and of which the irradiation angle is variable.

2. Related Background Art

FIG. 1 of the accompanying drawings is a perspective view of a camera provided with an illuminating optical system according to the prior art. The camera 1 of FIG. 1 is provided with a camera body 2. On the front side (the object side) of the camera body 2, as shown, there are disposed a photo-taking lens 3 having an optical axis 4, a finder window 5 and an illuminating optical system 6.

In order to alleviate the red-eye phenomenon (a phenomenon that eyes are photographed in red), the illuminating optical system 6 is disposed at a location as far as possible from the photo-taking lens 3. That is, the illuminating optical system 6 is disposed at the right corner or the left corner of the camera body 2 as viewed from the front of the camera body 2.

FIGS. 2A and 2B of the accompanying drawings are cross-sectional views of the illuminating optical system 6 of FIG. 1, FIG. 2A being a cross-sectional view along a plane perpendicular to the lengthwise axis of a xenon tube 7, and FIG. 2B being a cross-sectional view along a plane containing the lengthwise axis of the xenon tube 7 and the optical axis 9 of a Fresnel lens 8.

As shown in FIGS. 1, 2A and 2B, the illuminating optical system 6 comprises the xenon tube 7 of a cylindrical shape and a straight tube type, a reflector 10 and the Fresnel lens 8. The xenon tube 7 which is a light emitting source is positioned so that the lengthwise axis thereof may be perpendicular to the optical axis 4 of the photo-taking lens 3. The reflector 10 is of such a shape that surrounds the xenon tube 7, and reflects the light from the xenon tube 7 toward the Fresnel lens 8.

Also, the optical axis 9 of the Fresnel lens 8 is parallel to the optical axis 4 of the photo-taking lens 3 and is coincident with the center axis (the configuration center axis) 12 of the configuration (the shape prescribed by the outer side) 11 of the Fresnel lens 8.

Further, that surface of the Fresnel lens 8 which is adjacent to the object side (the left side as viewed in FIG. 2A) is formed into a flat shape perpendicular to the optical axis 9 of the Fresnel lens 8. On the other hand, that surface of the Fresnel lens 8 which is adjacent to the xenon tube 7 is formed into a Fresnel surface shape comprising a plurality of zonal Fresnel elements having the optical axis 9 as the center of rotation.

Thus, a light beam emitted from the xenon tube 7 is reflected on the reflector 10 and indirectly enters the Fresnel lens 8 or directly enters the Fresnel lens 8 from the xenon tube 7. The light refracted by the Fresnel lens 8 is directed so as to illuminate the photographing range of the photo-taking lens 3.

To effectively illuminate the photographing range of the photo-taking lens 3 with the light beam emitted from the xenon tube 7, it is important to make the irradiation angle of the illuminating optical system 6 approximate to the angle of view of the photo-taking lens 3.

The illumination range of the illuminating optical system 6 corresponds to a range of d×tan ε when the irradiation angle is ε at a position far by a distance d. On the other hand, the photographing range of the photo-taking lens 3 corresponds to a range of d×tan ω when a half angle of view is ω. However, the photographing range of the photo-taking lens 3 varies depending on the focal length thereof. Also, even if the focal length is the same, the photographing range will vary when the in-focus state (the photographing distance) differs. That is, the photographing range of the photo-taking lens 3 varies depending on both of the photographing distance and the focal length.

FIG. 3 of the accompanying drawings shows the optical path of the light beam emitted from the xenon tube 7.

As shown in FIG. 3, in the illuminating optical system according to the prior art, spherical aberration is well corrected so that the photographing range of the photo-taking lens 3 may be well illuminated. However, a single Fresnel surface alone cannot correct spherical aberration and sine condition at a time. Thus, in the illuminating optical system according to the prior art, spherical aberration is well corrected, but sine condition has not been sufficiently corrected. In this case, it would occur to mind, for example, to form the opposite surfaces of the Fresnel lens 8 into a Fresnel surface shape to thereby correct spherical aberration and sine condition at a time.

In the Fresnel surface, however, each Fresnel element does not form a continuous shape as a whole and therefore, the loss of the quantity of light is great. Accordingly, if the opposite surfaces of the Fresnel lens 8 are formed into a Fresnel surface shape, it will become impossible to effect efficient illumination. If the illumination range side surface of the Fresnel lens 8 is also formed into a Fresnel surface shape, when this illumination range side Fresnel surface exposed to the outside is stained, there has been the inconvenience that the stain cannot be easily wiped off.

FIG. 4 of the accompanying drawings schematically shows the construction of an illuminating optical system having no Fresnel lens.

As shown in FIG. 4, in the illuminating optical system in which a Fresnel lens is absent, the irradiation angle ε is prescribed on the basis of the position relation between an opening portion 20 in the front of a camera and a xenon tube 21. Actually, however, in order to make the camera body thin, there is disposed a Fresnel lens having condensing action. Design has been made such that the virtual image position (see FIG. 3) of the xenon tube by the Fresnel lens becomes substantially the same as the position (see FIG. 4) of the xenon tube when a Fresnel lens is not disposed. Accordingly, design has been made such that the Fresnel angle of each Fresnel element becomes greater as the element becomes more distant from the optical axis.

Now, in recent years, cameras provided with zoom lens with high zoom ratio have been becoming the mainstream in cameras of the lens shutter type. FIG. 5 of the accompanying drawings schematically shows an illuminating optical system carried on a camera provided with a zoom lens.

In such a zoom lens, f-number at the telephoto end is great and a powerful illuminating optical system is necessary to obtain a good exposure characteristic. However, at the telephoto end, an illuminating light beam must be collected in a narrow photographing range, and conversely at the wide angle end, a wide photographing range must be uniformly illuminated.

Therefore, in the illuminating optical system carried on the camera provided with a zoom lens, as shown in FIG. 5, a xenon tube 30 has been moved along an optical axis 32 relative to a Fresnel lens 31 to thereby vary the illumination range and adjust the illumination range to the photographing range of a photo-taking lens for zooming. In FIG. 5, a broken line indicates the position of the xenon tube 30 close to the Fresnel lens 31 when a wide photographing range at the wide angle end is illuminated. Also, in FIG. 5, a solid line indicates the position of the xenon tube 30 separate from the Fresnel lens 31 when a narrow photographing range at the telephoto end is illuminated.

Also, in recent years, the diversification of the design of camera bodies has been advanced. Unlike the conventional design in which the shape of the front face of a camera is comprised of only a flat surface perpendicular to the optical axis of a photo-taking lens, for example, designs in which the thickness of the marginal portion of a camera body is smaller than the central portion of the camera body have increased. As described above, cameras in which importance is attached to design are increasing, and particularly cameras of which the front face is comprised of a complicated shape are increasing.

In a camera wherein importance is attached to design as described above, it is preferable in design that the surface of the illuminating optical system thereof which is most adjacent to the photographing range be a shape free of any level difference which matches the outer shape of the camera body. In the prior-art illuminating optical system, however, the front surface of the Fresnel lens, i.e., the surface adjacent to the photographing range, has been formed into a flat surface shape perpendicular to the optical axis of the photo-taking lens, and this has led to the inconvenience that design cannot be given priority.

In order to solve such an inconvenience in design, there would occur to mind, for example, a method of disposing on the illumination range side of the illuminating optical system a protective member of a shape matching the outer shape and which will not affect the illumination characteristic. There would also occur to mind a method of simply incline the Fresnel lens so as to match the outer shape.

In the case of the former method, however, a space in which the protective member becomes necessary and it becomes impossible to achieve the thinning of the camera body. Also, in terms of illumination efficiency, there is the loss of light by the reflection on the protective member, and this is not preferable. On the other hand, in the case of the latter method, sine condition is not sufficiently corrected in the Fresnel lens and therefore, coma occurs and the illumination range becomes one-sided, and this is not preferable. Thus, the disposition of the illuminating optical system has been a great limitation in designing the camera body.

Also, in order to eliminate the above-described inconvenience regarding the occurrence of coma, it would occur to mind to form for example, the Fresnel surface into a shape non-rotation-symmetrical with respect to the optical axis of the lens to thereby prevent the illumination range from becoming one-sided. However, the working itself of such a non-rotation-symmetrical Fresnel surface is difficult and desired working accuracy cannot be secured and therefore, this has been impossible in practice.

FIG. 6 of the accompanying drawings schematically shows the construction of an illuminating optical system disclosed in applicant's Japanese Laid-Open Patent Application No. 6-332044. In FIG. 6, the illuminating optical system comprises a xenon tube 40, a reflector 41 and a Fresnel lens 42. In the illuminating optical system of FIG. 6, the one-sidedness of the illumination range due to the inclination θ of the Fresnel lens 42 is offset and corrected by the one-sidedness of the illumination range by the point of intersection between the optical axis of the lens and the lens, i.e., the center of the lens, being shifted by Δ relative to the center axis 44 of a lens configuration 43. Thus, such an illuminating optical system of which the one-sidedness of the illumination range will not occur even if the Fresnel lens 42 is inclined is realized and the design of the camera body is given priority.

However, when an attempt is made to apply the construction disclosed in Japanese Laid-Open Patent Application No. 6-332044 to a so-called variable irradiation angle illuminating optical system of which the irradiation angle can be varied, the amount of one-sidedness of the illumination range varies as the irradiation angle is varied. Therefore, the photographing range of the photo-taking lens can be well illuminated at neither of the wide angle end and the telephoto end.

SUMMARY OF THE INVENTION

The present invention has been made in view of the above-noted problems and the object thereof is to provide a variable irradiation angle illuminating optical system which, when applied, for example, to a camera, can give priority to the design of a camera body and yet can well illuminate a predetermined photographing range.

To solve the above-noted problems, according to the present invention, there is provided an illuminating optical system provided with light emitting means for supplying illuminating light, and directing means for directing the light beam from the light emitting means by refracting action, characterized in that at least one of the light emitting means and the directing means is moved in a direction differing from the direction of the optical axis of the directing means and the spacing between the light emitting means and the directing means is varied to thereby vary the illumination range at a predetermined distance.

Also, according to a preferred mode of the present invention, the light emitting means is moved in a direction differing from the direction of the optical axis of the directing means to thereby vary the illumination range at the predetermined distance.

BRIEF DESCRIPTION OF THE DRAWINGS

FIGS. 14A and 14B show the manner in which in the illuminating optical system according to the prior art, the xenon tube is moved along the lens optical axis to thereby vary the illumination range, FIG. 14A showing the position of the image 107'w of a xenon tube 107w by the Fresnel lens 109 at the wide angle end, and FIG. 14B showing the position of the image 107't of a xenon tube 107t by the Fresnel lens 109 at the telephoto end.

DESCRIPTION OF THE PREFERRED EMBODIMENTS

First, in an illuminating optical system used in a camera or the like, an object is illuminated while the exposure of a photo-taking lens is effected. Particularly when the object is a dark scene to be photographed or the like and is to be illuminated, a light emitting source should desirably be a light source applying a powerful quantity of light momentarily. So, in the illuminating optical system used in a camera or the like, a xenon tube is usually used as the light emitting source. The xenon tube is generally bar-like and cylindrical. The emitted light intensity distribution of the xenon tube has a feature that it is rotation-symmetrical with respect to the lengthwise axis of the xenon tube and becomes constant along the lengthwise axis of the xenon tube.

Also, as directing means for directing a light beam emitted from the light emitting source so as to illuminate a predetermined photographing range, use is made of a lens component having the refracting action (condensing action). Particularly, a plastic material is often used as an optical material so that the lens component may be easy to hold and can be manufactured inexpensively. Also, as the lens component, use is usually made of a Fresnel lens which is small in the variation in the thickness in the central portion and marginal portion thereof.

When an illuminating optical system according to the present invention is incorporated into a camera, it is desirable that the illumination range of the illuminating optical system cover the photographing range of a photo-taking lens. Now, as previously described, in order to prevent the red-eye phenomenon, the photo-taking lens and the illuminating optical system are disposed in spaced-apart relationship with each other. Accordingly, with it taken into account that parallax occurs depending on the position of the object, it is necessary to illuminate the photographing range well without depending on the position of the object.

Figure 1:
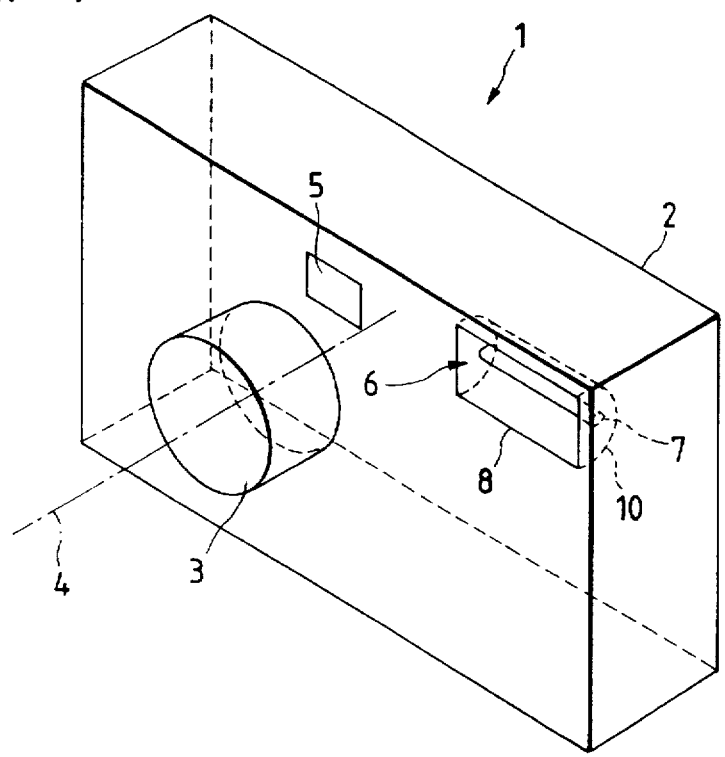
FIG. 1 is a perspective view of a camera provided with an illuminating optical system according to the prior art.
Figure 2A:
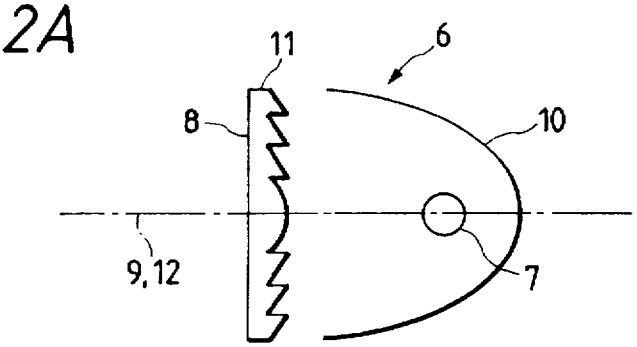
FIGS. 2A and 2B are cross-sectional views of the illuminating optical system 6 of FIG. 1, FIG. 2A being a cross-sectional view along a plane perpendicular to the lengthwise axis of a xenon tube 7, and FIG. 2B being a cross-sectional view along a plane containing the lengthwise axis of the xenon tube 7 and the optical axis 9 of a Fresnel lens 8.
Figure 2B:
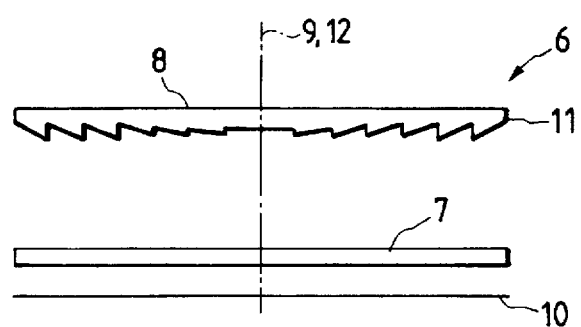
Figure 3:
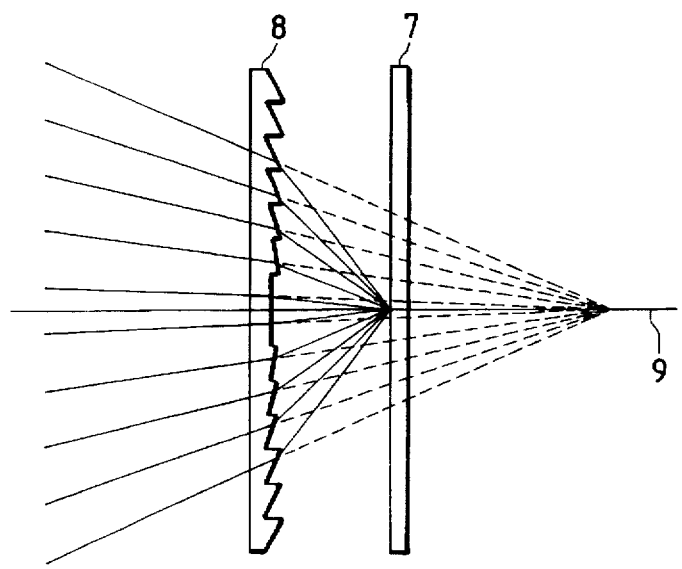
FIG. 3 shows the optical path of a light beam emitted from the xenon tube 7.
Figure 4:
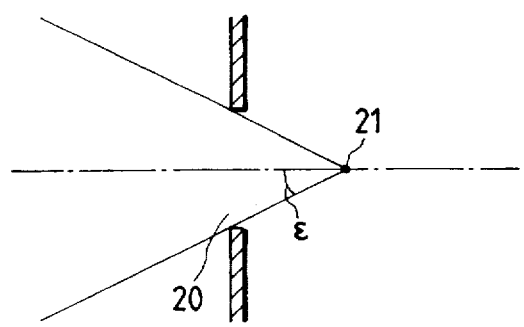
FIG. 4 schematically shows the construction of an illuminating optical system having no Fresnel lens.
Figure 5:
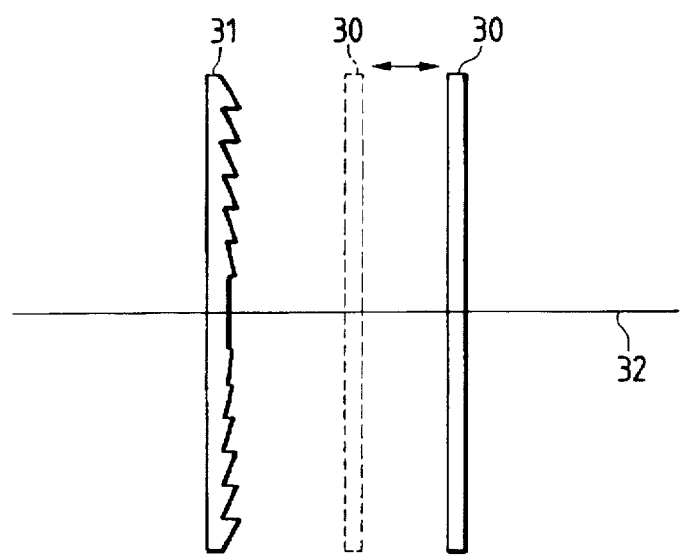
FIG. 5 schematically shows the construction of an illuminating optical system carried on a camera provided with a zoom lens.
Figure 6:
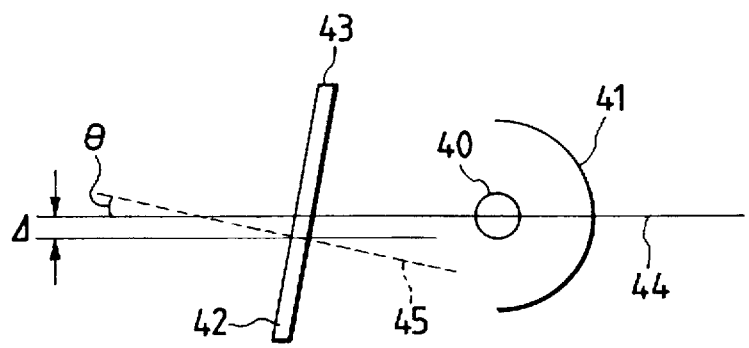
FIG. 6 schematically shows the construction of an illuminating optical system disclosed in applicant's Japanese Laid-Open Patent Application No. 6-332044.
Figure 7:
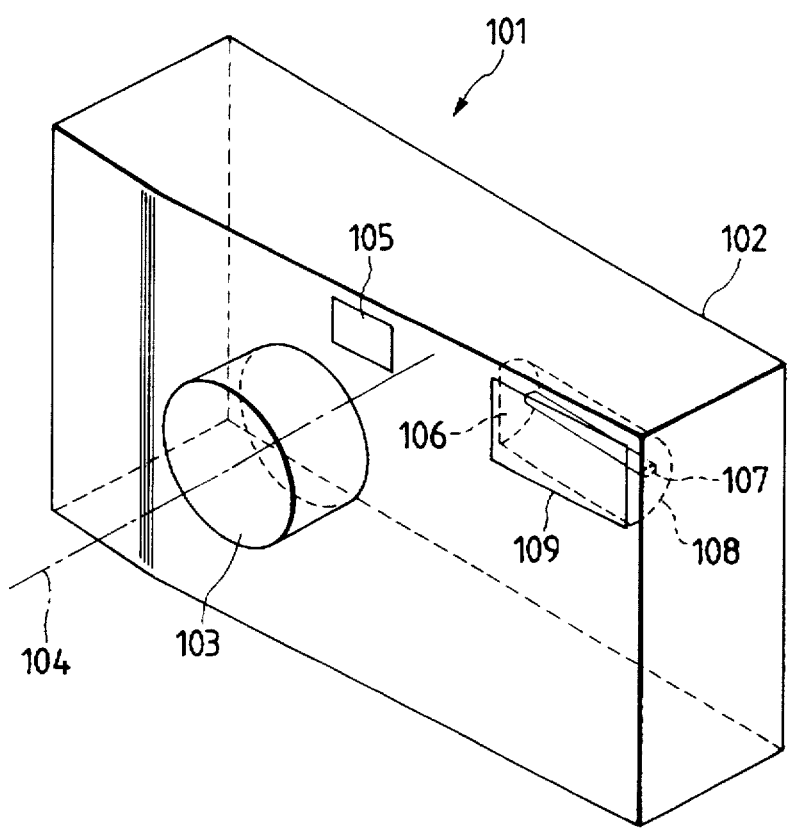
FIG. 7 is a perspective view showing the construction of a camera having an illuminating optical system according to the present invention incorporated therein.

FIG. 7 is a perspective view showing the construction of a camera having the illuminating optical system according to the present invention incorporated therein.

The camera 101 of FIG. 7 is provided with a camera body 102. On the front side (the object side) of the camera body 102, as shown, there are disposed a photo-taking lens 103 having an optical axis 104, a finder window 105 and an illuminating optical system 106.

The illuminating optical system 106 comprises a xenon tube 107 of a cylindrical shape and a straight tube type, a reflector 108 and a Fresnel lens 109. The xenon tube 107 which is a light emitting source is positioned so that the lengthwise axis thereof may be perpendicular to the optical axis 104 of the photo-taking lens 103. The reflector 108 has such a shape that surrounds the xenon tube 107, and reflects the light from the xenon tube 107 toward the Fresnel lens 109.

Thus, the Fresnel lens 109 is disposed on the illumination range side of the xenon tube 107 and constitutes directing means for directing a light beam emitted from the xenon tube 107 so as to illuminate a predetermined illumination range. As will be described later, the spacing between the xenon tube 107 and the Fresnel lens 109 is varied to thereby vary the illumination range at a predetermined distance.

Figure 8A:
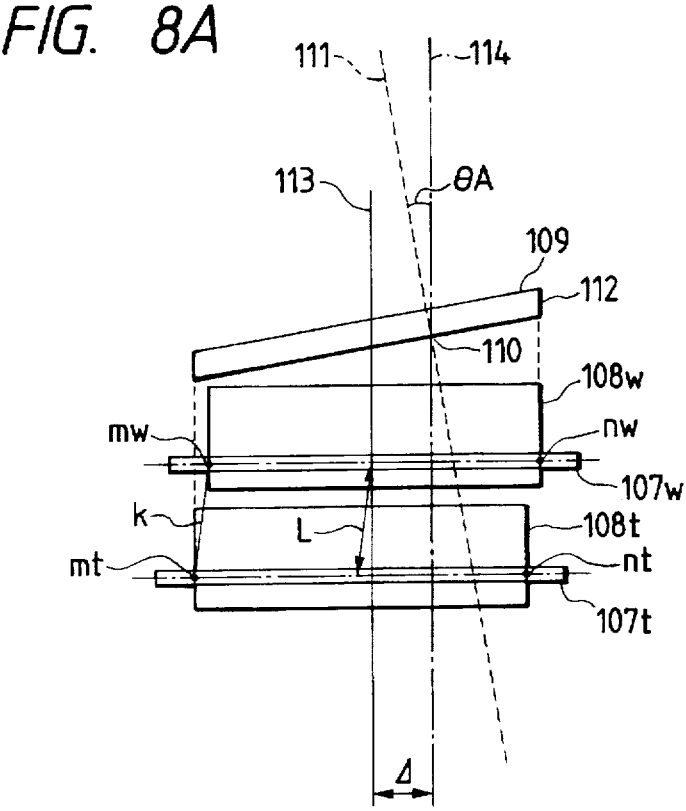
FIGS. 8A and 8B are cross-sectional views showing the optical arrangement of the illuminating optical system according to the present invention.
Figure 8B:
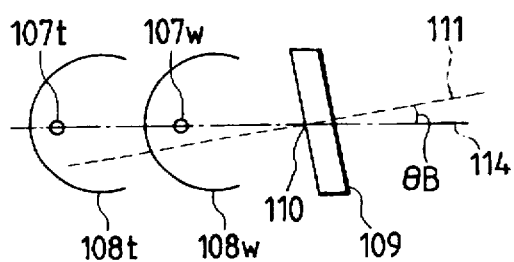
Figure 9:
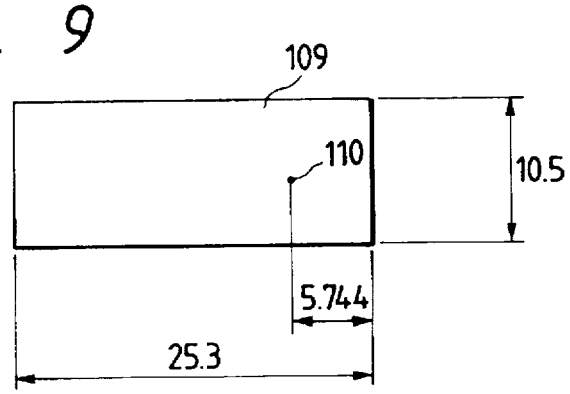
FIG. 9 is a view showing a configurational dimension as it is seen from the direction of the lens optical axis 111 of a Fresnel lens 109.

FIGS. 8A and 8B are cross-sectional views showing the optical arrangement of the illuminating optical system according to the present invention. FIG. 8A is a cross-sectional view along a plane containing the lens center 110 and the xenon tube 107, and FIG. 8B is a cross-sectional view along a plane passing through the lens optical axis 111 and perpendicular to the cross-section of FIG. 8A. FIG. 9 shows the configurational dimension of the Fresnel lens 109.

In FIGS. 8A and 8B, the center axis of the configurational shape 112 of the Fresnel lens 109 is designated by the reference numeral 113. Also, the point of intersection between the lens optical axis 111 of the Fresnel lens 109 and the Fresnel lens 109, i.e., the lens center, is denoted by the reference numeral 110. The axis 114 indicates a fiducial optical axis parallel to the optical axis 104 of the photo-taking lens 103 and passing through the lens center 110.

Also, m and n designate the points at the opposite ends of the xenon tube 107. The suffixes w and t of the xenon tube 107, the reflector 108 and the points m and n indicate a state in which the illumination range at a predetermined distance is widest, i.e., the wide angle end, and a state in which said illumination range is narrowest, i.e., the telephoto end, respectively. Also, the reference character L designates a vector indicative of the reciprocal movement of the xenon tube 107 between the wide angle end and the telephoto end.

The Fresnel lens 109 has its surface adjacent to the xenon tube 107 formed into a Fresnel surface shape and has its other surface adjacent to the illumination range side formed into a flat surface perpendicular to the lens optical axis 111.

As can be seen from FIGS. 8A and 8B, in the Fresnel lens 109, the fiducial optical axis 114 and the configuration center axis 113 are spaced apart by $\Delta$ from each other. Also, the lens optical axis 111 is inclined by an angle $\theta A$ with respect to the fiducial optical axis 114 in FIG. 8A, and is inclined by an angle $\theta B$ with respect to the fiducial optical axis 114 in FIG. 8B. A segment k straight linking the point mw and the point mt together is not parallel to the lens optical axis 111.

Description will now be made of a method of correcting the illumination range when the Fresnel lens is inclined in the present invention.

Figure 10:
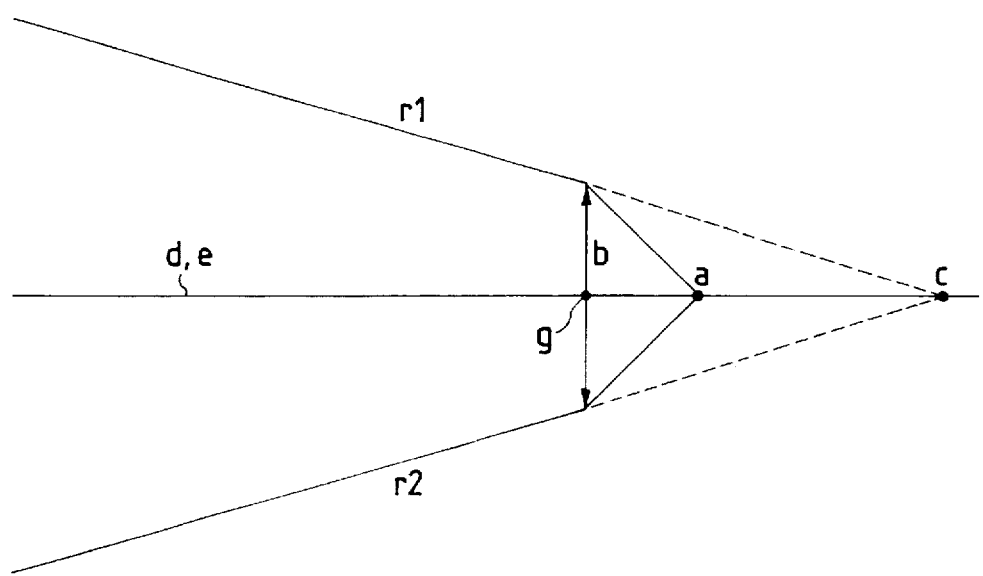
FIG. 10 is a conceptional view showing the state of the illuminating optical system according to the prior art in which a Fresnel lens is not inclined.
Figure 11:
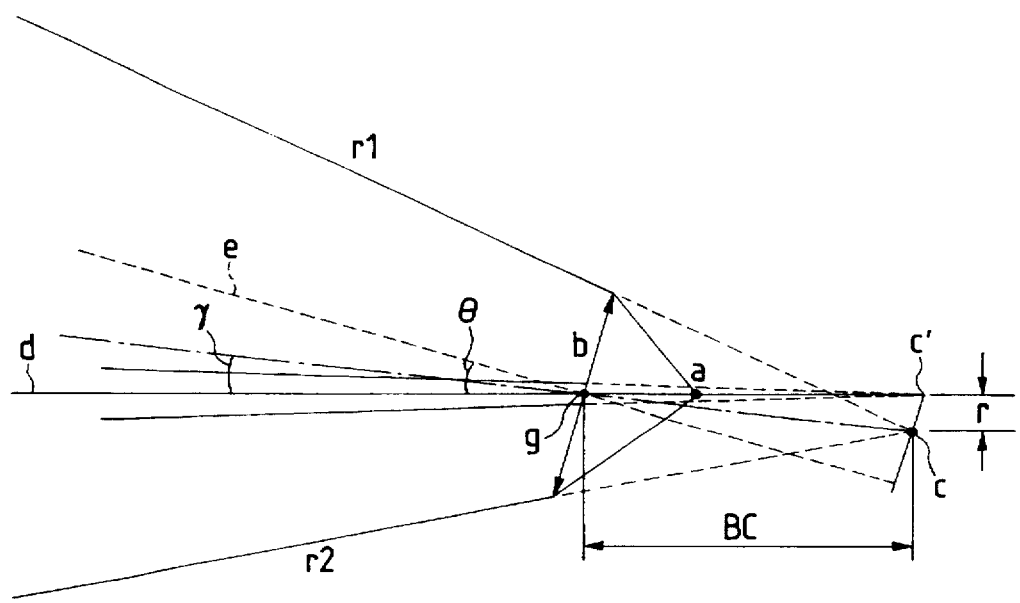
FIG. 11 is a conceptional view showing a state in which the Fresnel lens is inclined.
Figure 12:
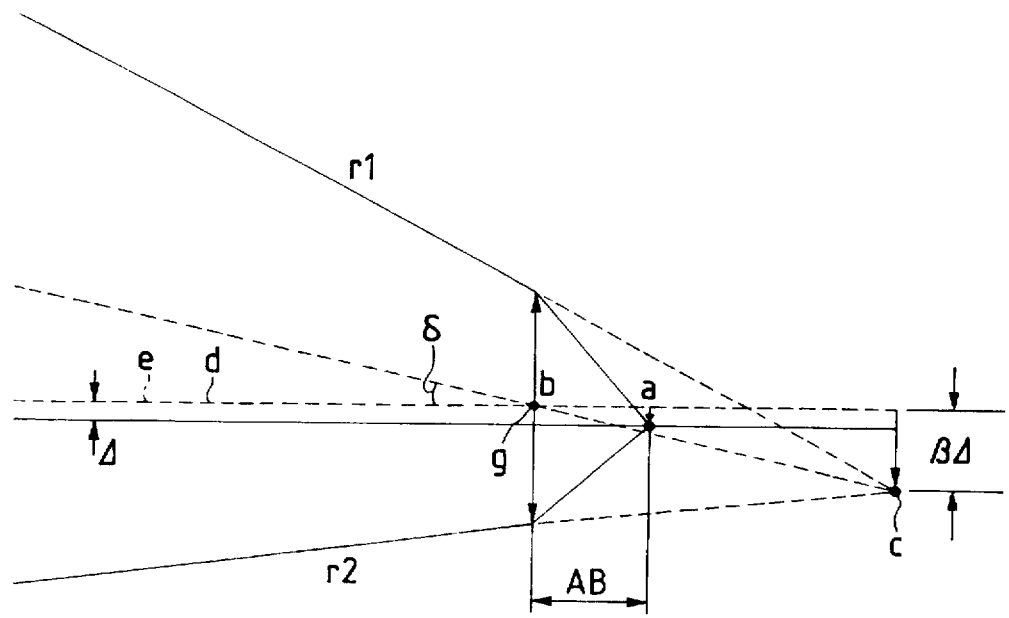
FIG. 12 is a conceptional view showing a state in which the optical axis of the lens is shifted relative to a fiducial axis.
Figure 13:
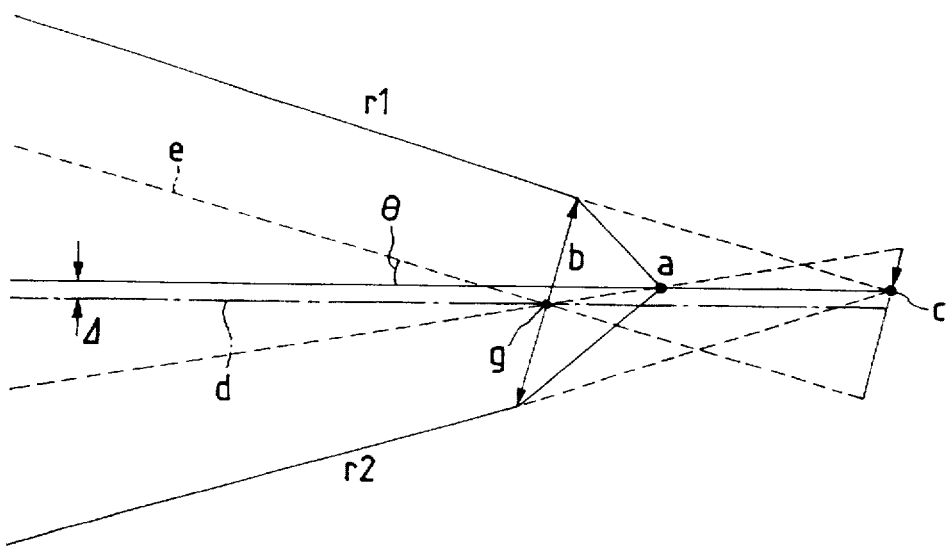
FIG. 13 is a conceptional view showing a state in which the one-sidedness of an illumination range by the inclination of the Fresnel lens has been corrected by the one-sidedness of the illumination range by the shift of the Fresnel lens.

FIG. 10 is a conceptional view showing the state of the illuminating optical system according to the prior art in which the Fresnel lens is not inclined. FIG. 11 is a conceptional view showing a state in which the Fresnel lens is inclined. FIG. 12 is a conceptional view showing a state in which the lens optical axis has been shifted relative to the fiducial optical axis. FIG. 13 is a conceptional view showing a state in which the one-sidedness of the illumination range due to the inclination of the Fresnel lens has been corrected by the one-sidedness of the illumination range due to the shift of the Fresnel lens.

In FIGS. 10 to 13, the letter a designates a light emitting source, the letter b denotes a Fresnel lens which is directing means, and the letter c designates the position of the image of the light emitting source a by the Fresnel lens b. Also, the reference characters r1 and r2 denote the optical paths of the rays of light emitted from the light emitting source a, the letter d designates a fiducial optical axis parallel to the optical axis of the photo-taking lens and passing through the lens center g of the Fresnel lens b, and the letter e denotes the lens optical axis of the Fresnel lens b. In these figures, the Fresnel lens b is expressed as a thin lens, but its surface adjacent to the light emitting source a side is formed into a Fresnel surface shape, and its other surface is formed into a flat surface shape perpendicular to the lens optical axis e.

As shown in FIG. 10, in the example of the prior art wherein the Fresnel lens b is not inclined, the fiducial optical axis d and the lens optical axis e overlap each other and the light emitting source a is on the lens optical axis e. As a result, the image position c also has been on the optical axis e of the lens.

In FIG. 11, the Fresnel lens b is inclined by an angle $\theta$ with respect to the fiducial optical axis d in the plane of the drawing sheet of FIG. 11. In this case, the image position c' in the example of the prior art wherein the Fresnel lens b is not inclined moves to the image position c. The distance along the fiducial optical axis d from the lens center g to the image position c is BC, and the amount of movement of the image position along a direction perpendicular to the fiducial optical axis d on the plane of the drawing sheet is r. Also, the amount of inclination of the illumination range due to the inclination of the Fresnel lens b is $\gamma$.

When the Fresnel lens b is inclined, spherical aberration and sine condition cannot be corrected at a time by a Fresnel surface alone, as previously described. Therefore, coma occurs and the image position c shifts and as a result, the illumination range becomes one-sided by an angle $\gamma$.

In FIG. 12, from the disposition of FIG. 10, the lens center g is shifted by $\Delta$ in a direction perpendicular to the fiducial optical axis d. That is, the lens optical axis e and the fiducial optical axis d are shifted by a shift amount $\Delta$, and the lens optical axis e and the fiducial optical axis d are coincident with each other. The light emitting source a is positioned at an interval of a distance AB from the lens center g along the fiducial optical axis d. The imaging magnification of the light emitting source a is $\beta$. When the lens center g is thus shifted by $\Delta$, the light emitting source a has an object height of $\Delta$, and the image position c thereof has an image height of $\beta\Delta$. Accordingly, due to the shift of the fiducial optical axis d, the illumination range becomes one-sided by an angle $\delta$.

FIG. 13 shows a state in which the one-sidedness $\gamma$ of the illumination range due to the inclination of the Fresnel lens b has been corrected by the one-sidedness $\delta$ of the illumination range due to the shift of the lens center g of the Fresnel lens b.

The above discussion is based on the construction in a cross-section perpendicular to the lengthwise axis of the xenon tube. On the other hand, paying attention to the construction in a cross-section containing the lengthwise axis of the xenon tube, the illuminating optical system according to the prior art has a construction symmetrical with respect to the lens optical axis of the Fresnel lens. In contrast, when the Fresnel lens is inclined or shifted, the symmetry of the disposition of the xenon tube with respect to the lens optical axis is destroyed and as in the above discussion, the illumination range becomes one-sided also in the cross-section containing the lengthwise axis of the xenon tube. Accordingly, again in this case, it is possible to correct the one-sidedness of the illumination range due to the inclination of the Fresnel lens by the one-sidedness of the illumination range due to the shift of the Fresnel lens.

Now, when the photo-taking lens is a variable power optical system, the photographing range varies with the variable power of the photo-taking lens. Accordingly, in order to illuminate an object efficiently, it is desirable to vary the illumination range in accordance with a variation in the photographing range.

In the illuminating optical system according to the prior art, the lens optical axis of the Fresnel lens and the optical axis of the photo-taking lens have been parallel to each other and in order to vary the illumination range, the xenon tube has been moved along the optical axis of the lens. Accordingly, as shown in FIGS. 14A and 14B, the image position of the xenon tube by the Fresnel lens lies on the lens optical axis both at the wide angle end and the telephoto end and therefore, during the variable power from the wide angle end to the telephoto end, the photographing range of the photo-taking lens could be well illuminated without the illumination range becoming one-sided.

FIG. 14A shows the position of the image 107'w of the xenon tube 107w at the wide angle end by the Fresnel lens 109, and FIG. 14B shows the position of the image 107't of the xenon tube 107t at the telephoto end by the Fresnel lens 109.

In FIG. 14A showing the state at the wide angle end, the virtual image of the central point pw of the xenon tube 107w (i.e., the point of intersection between the lengthwise axis of the xenon tube 107w and the lens optical axis 111 of the Fresnel lens 109) by the Fresnel lens 109 is formed at a position p'w on the lens optical axis 111. Also, the virtual images of the left end point mw and right end point nw of the xenon tube 107w as viewed in FIG. 14A by the Fresnel lens 109 are formed at positions m'w and n'w, respectively. Thus, at the wide angle end, the position of the image 107'w of the xenon tube 107w by the Fresnel lens 109 lies on the lens optical axis 111.

On the other hand, in FIG. 14B showing the state at the telephoto end, the virtual image of the central point pw of the xenon tube 107t (i.e., the point of intersection between the lengthwise axis of the xenon tube 107t and the lens optical axis 111 of the Fresnel lens 109) by the Fresnel lens 109 is formed at a position p't on the lens optical axis 111. Also, the virtual images of the left end point mt and right end point nt of the xenon tube 107t as viewed in FIG. 14B by the Fresnel lens 109 are formed at positions m't and n't, respectively. Thus, at the wide angle end, the position of the image 107't of the xenon tube 107t by the Fresnel lens 109 lies on the lens optical axis 111.

However, the method of correcting the illumination range by the inclination and shift of the Fresnel lens in the above discussion is applied only when the Fresnel lens and the xenon tube are in a predetermined positional relation. Accordingly, in such a case where the xenon tube is moved along the lens optical axis of the Fresnel lens, the shift correction amount for correcting the one-sidedness of the illumination range due to the inclination of the Fresnel lens also varies. Therefore, it becomes impossible to illuminate the photographing range of the photo-taking lens well without the illumination range becoming one-sided over the entire variable power range.

So, description will now be made of a method of correcting the one-sidedness of the illumination range occurring in the present invention when the spacing between the xenon tube and the Fresnel lens varies. In the ensuing description, however, only the xenon tube is moved.

Figure 15B:
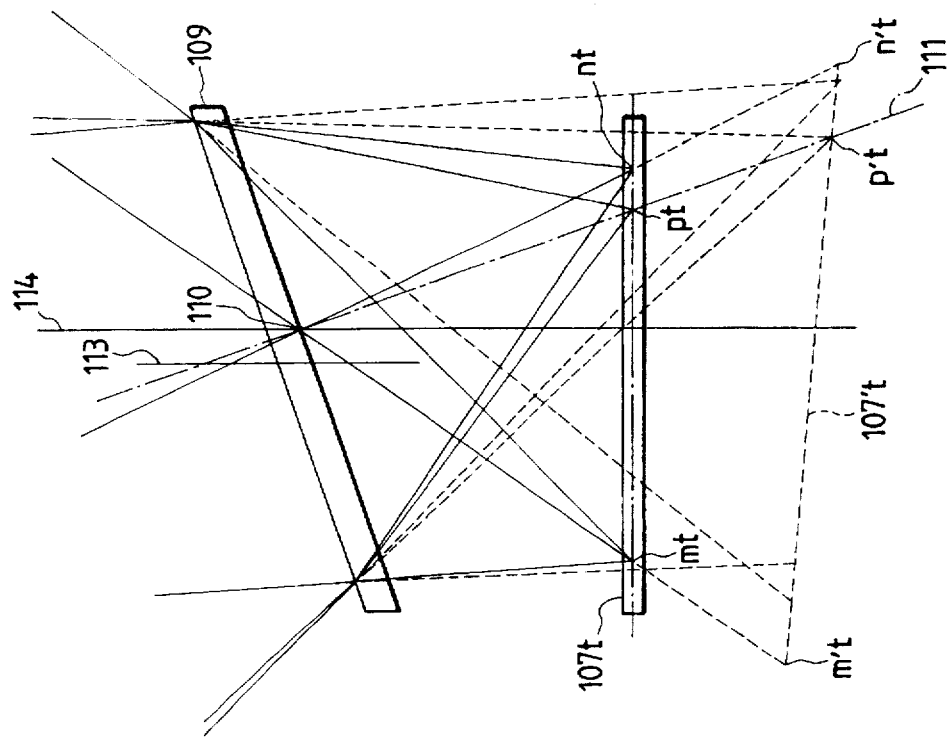
FIGS. 15A and 15B show the manner in which the spacing along a fiducial optical axis between the Fresnel lens and the xenon tube is varied to thereby vary the irradiation angle by the illuminating optical system, FIG. 15A showing the state at the wide angle end, and FIG. 15B showing the state at the telephoto end.
Figure 15A:
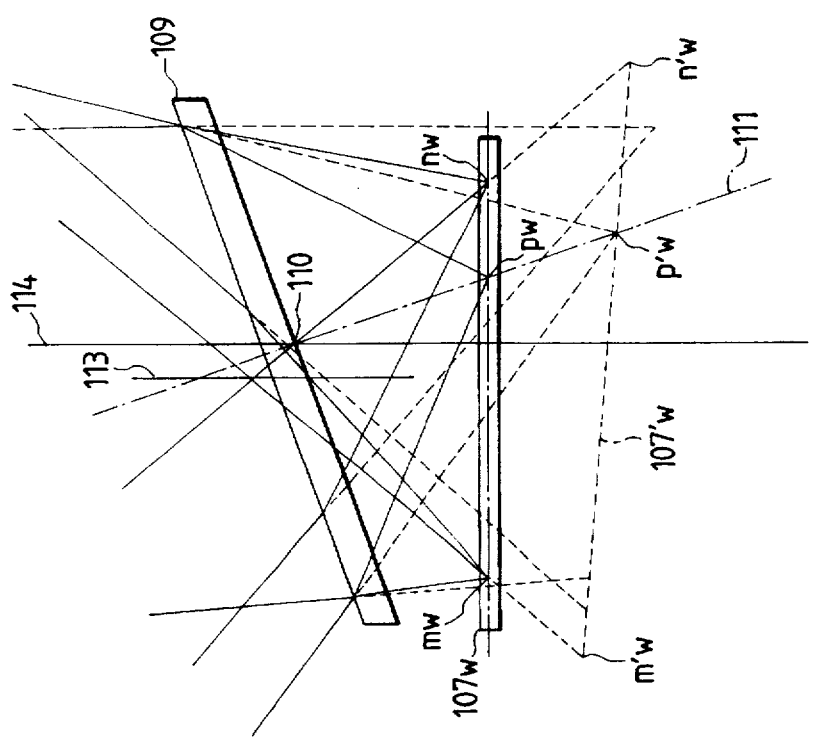

In the present invention, the spacing along the fiducial optical axis between the Fresnel lens and the xenon tube is varied to thereby vary the irradiation angle by the illuminating optical system. That is, between the state at the wide angle end shown in FIG. 15A and the state at the telephoto end shown in FIG. 15B, the spacing along the fiducial optical axis 114 between the Fresnel lens 109 and the xenon tube 107 differs and therefore, the image magnification of the xenon tube 107 by the Fresnel lens 109 differs. Therefore, the one-sidedness of the illumination range when the Fresnel lens 109 is inclined or shifted by a predetermined amount differs between the wide angle end and the telephoto end.

Now, as previously described, when the lens optical axis 111 is shifted relative to the xenon tube 107, the illumination range becomes one-sided (see FIG. 12). Thus, even if conversely, the xenon tube 107 is shifted relative to the lens optical axis 111, the illumination range will become one-sided.

So, the xenon tube 107 is moved in a direction differing from the lens optical axis 111 to thereby correct the one-sidedness of the illumination range. In this manner, illumination free of the one-sidedness of the illumination range is made possible in all xenon tube position states in the irradiation angle variation area from the wide angle end to the telephoto end.

Figure 16A:
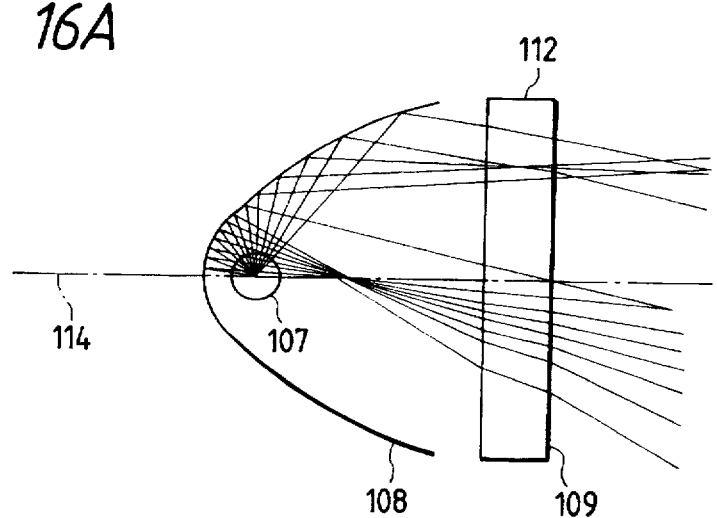
FIGS. 16A and 16B show a construction in which a reflector 108 having such a general shape that surrounds the xenon tube 107 is disposed on a side opposite to the illumination range side with respect to the xenon tube 107, FIG. 16A showing the optical path at the wide angle end, and FIG. 16B showing the optical path at the telephoto end.
Figure 16B:
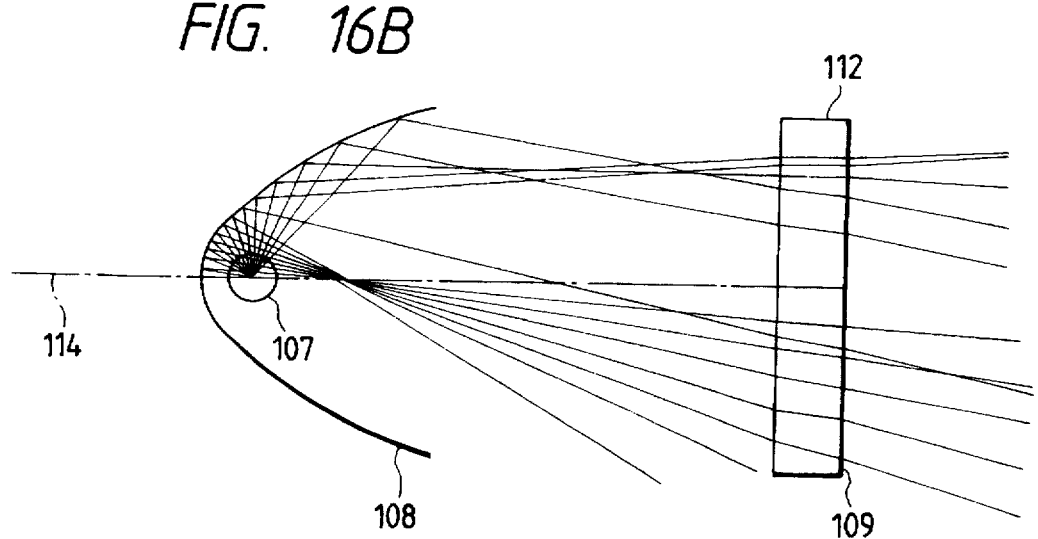

Particularly, in the present invention, as shown in FIGS. 16A and 16B, the reflector 108 having such a general shape that surrounds the xenon tube 107 is disposed on a side opposite to the illumination range side relative to the xenon tube 107. FIG. 16A shows the optical path at the wide angle end, and FIG. 16B shows the optical path at the telephoto end.

The xenon tube 107 is of a cylindrical shape, and in a direction perpendicular to the axis of the cylinder, a light beam is uniformly applied. Therefore, simply by disposing the Fresnel lens 109 on the object side of the xenon tube 107, it is impossible to make the light beam emitted from the xenon tube 107 efficiently contribute to illumination. So, it is effective to dispose the reflector 108 as shown in FIGS. 16A and 16B.

Thus, the light beam travelling from the xenon tube 107 toward a side opposite to the Fresnel lens 109 is once reflected by the reflector 108, whereafter it is directed by the Fresnel lens 109 so as to illuminate a predetermined illumination range, whereby the predetermined illumination range can be illuminated efficiently. As shown, it is also possible to form the reflecting surface of the reflector 108 into a spherical shape or an aspherical shape such as an elliptical surface, a parabolic surface or a hyperboloid, and further form it by a combination of a plurality of curved surfaces.

Also, in order to correct the one-sidedness of the illumination range and illuminate the photographing range well in all xenon tube position states from the wide angle end to the telephoto end, it is desirable to move the xenon tube 107 and the reflector 108 together with each other when the irradiation angle is varied.

Further, since the illuminating optical system is disposed in spaced-apart relationship with the photo-taking lens, the direction of the photographing range of the photo-taking lens relative to the illuminating optical system varies in conformity with the focal length of the photo-taking lens and the position of the object. Therefore, it is also possible to shift the Fresnel lens in a direction perpendicular to the optical axis of the photo-taking lens in conformity with a variation in the direction of the photographing range to thereby illuminate the photographing range well.

Figure 17:
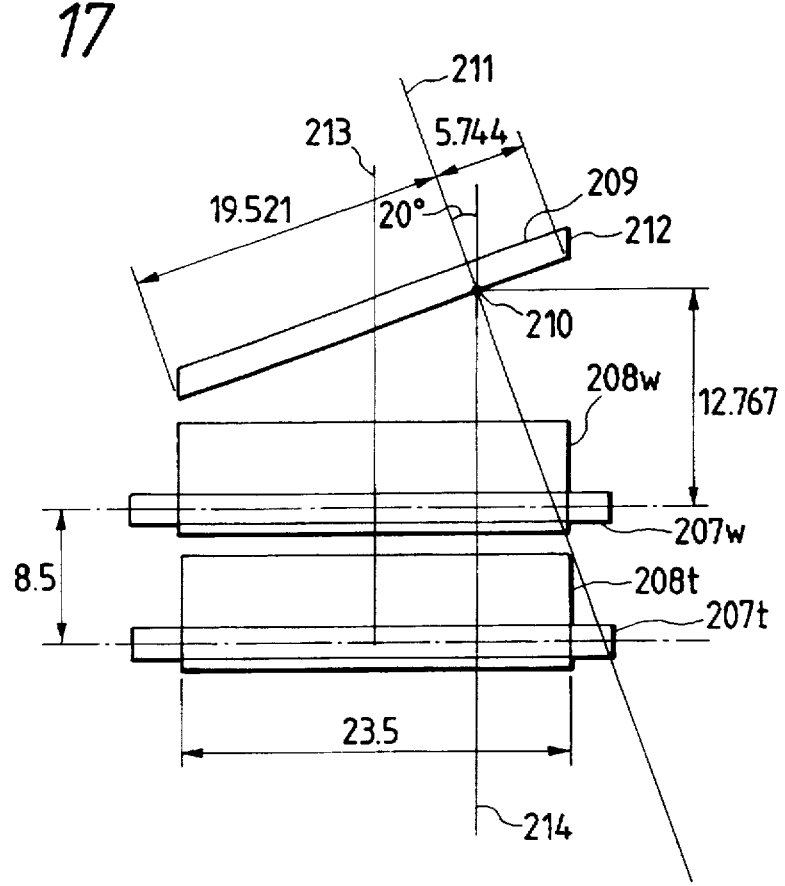
FIG. 17 is a cross-sectional view showing the optical arrangement of an illuminating optical system according to a first embodiment of the present invention.

FIG. 17 is a cross-sectional view showing the optical arrangement of an illuminating optical system according to a first embodiment of the present invention.

In FIG. 17, the center axis of the configuration 212 of a Fresnel lens 209 is designated by the reference numeral 213. Also, the point of intersection between the lens optical axis 211 of the Fresnel lens 209 and the Fresnel lens 209, i.e., the lens center, is denoted by the reference numeral 210. An axis 214 indicates a fiducial optical axis parallel to the optical axis 104 of a photo-taking lens 103 and passing through the lens center 210.

Also, the suffixes w and t of a xenon tube 207 and a reflector 208 indicate a state in which the illumination range at a predetermined distance is widest, i.e., the wide angle end, and a state in which said illumination range is narrowest, i.e., the telephoto end, respectively.

As shown in FIG. 17, in the first embodiment, the configuration center axis 213, the fiducial optical axis 214, the lens optical axis 211 and the xenon tube 207 lie on the same plane, and the fiducial optical axis 214 and the lens optical axis 211 form an angle of 20° therebetween in this plane. Also, the xenon tube 207 extends perpendicularly to the fiducial optical axis 214, and moves away from the Fresnel lens 209 along the fiducial optical axis 214 in a plane containing the configuration center 213 and the fiducial optical axis 214 during the change of the irradiation angle from the wide angle end to the telephoto end.

Figure 18:
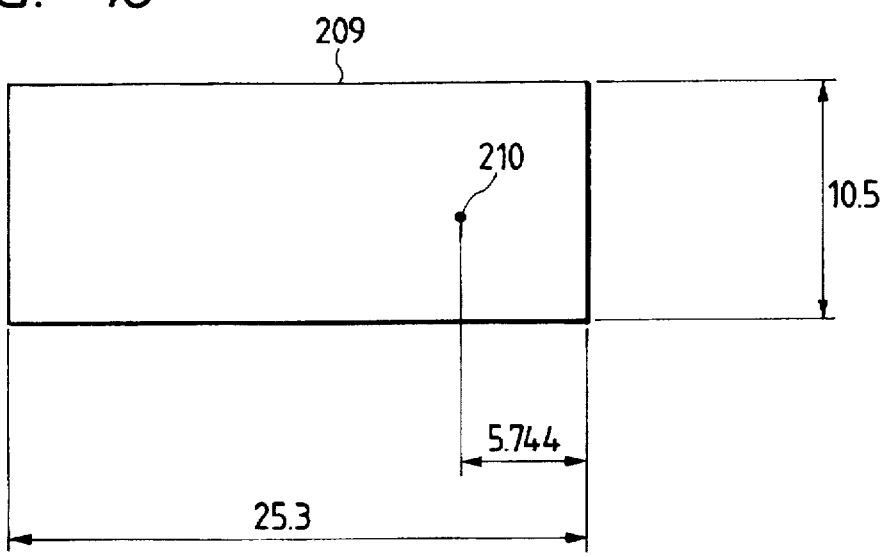
FIG. 18 shows the configuration 212 of a Fresnel lens 209 in FIG. 17 as it is seen from the direction of a lens optical axis 211.

In the first embodiment, the configuration 212 of the Fresnel lens 209, when viewed from the direction of the lens optical axis 211, is a rectangular shape having a dimension as shown in FIG. 18. That surface of the Fresnel lens 209 which is adjacent to the illumination range is formed into a flat shape perpendicular to the lens optical axis 211, and that surface of the Fresnel lens 209 which is adjacent to the xenon tube 207 is formed into a Fresnel surface shape.

The numerical data of the Fresnel surface of the Fresnel lens 209 are shown in Table 1 below. In Table 1, h indicates the distance from the lens optical axis 211, and σ (degrees) indicates the angle formed between the lens optical axis 211 and the normal direction of each Fresnel element, i.e., the Fresnel angle.

TABLE 1

| h [mm] | σ (degrees) |
|---|---|
| 0.5 | 0.00 |
| 1.5 | 0.00 |
| 2.5 | 1.24 |
| 3.5 | 2.21 |
| 4.5 | 3.14 |
| 5.5 | 3.70 |
| 6.5 | 6.95 |
| 7.5 | 11.81 |
| 8.5 | 22.80 |
| 9.5 | 25.11 |
| 10.5 | 27.30 |
| 11.5 | 29.37 |
| 12.5 | 31.32 |
| 13.5 | 33.16 |
| 14.5 | 34.89 |
| 15.5 | 36.53 |
| 16.5 | 38.09 |
| 17.5 | 39.64 |
| 18.5 | 41.00 |
| 19.5 | 42.00 |

Figure 19:
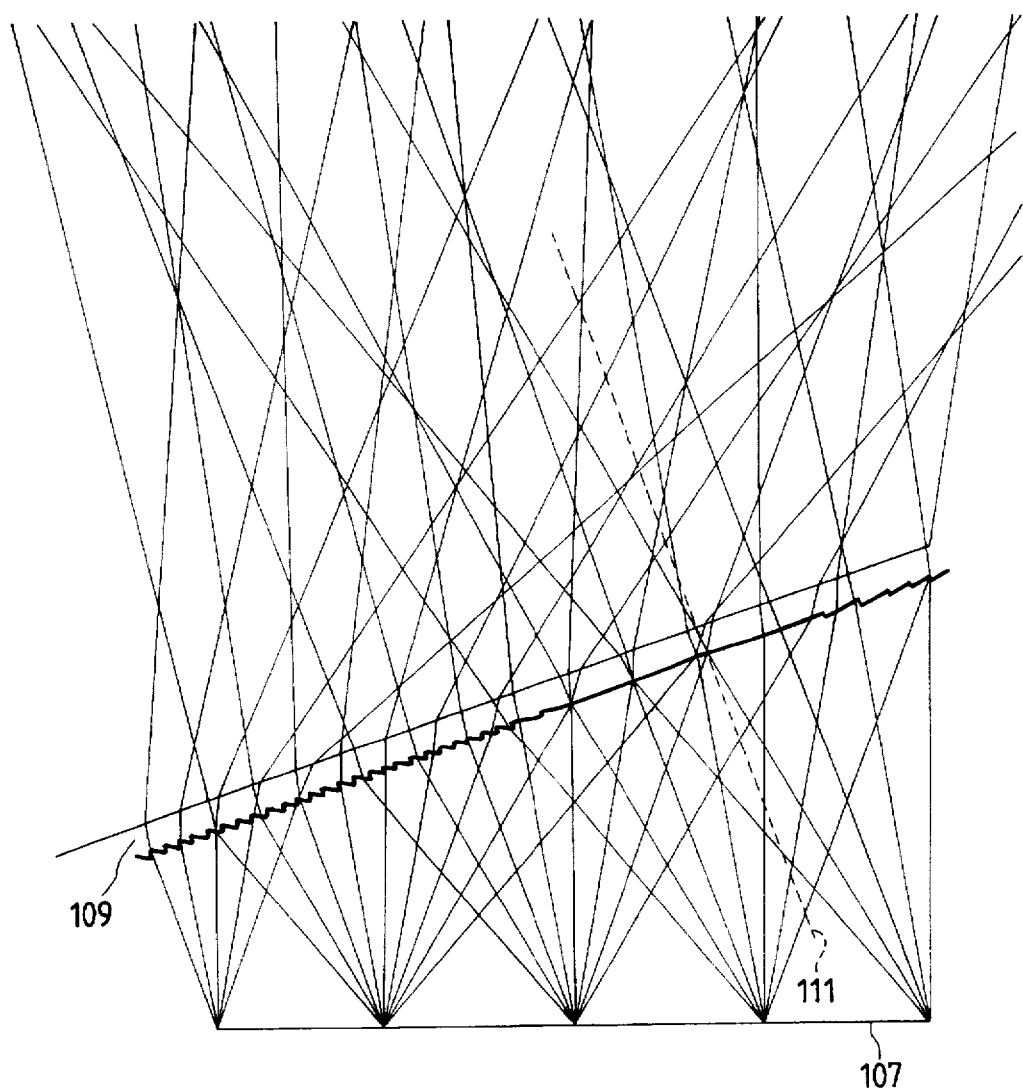
FIG. 19 shows the optical path at the wide angle end of the first embodiment.
Figure 20:
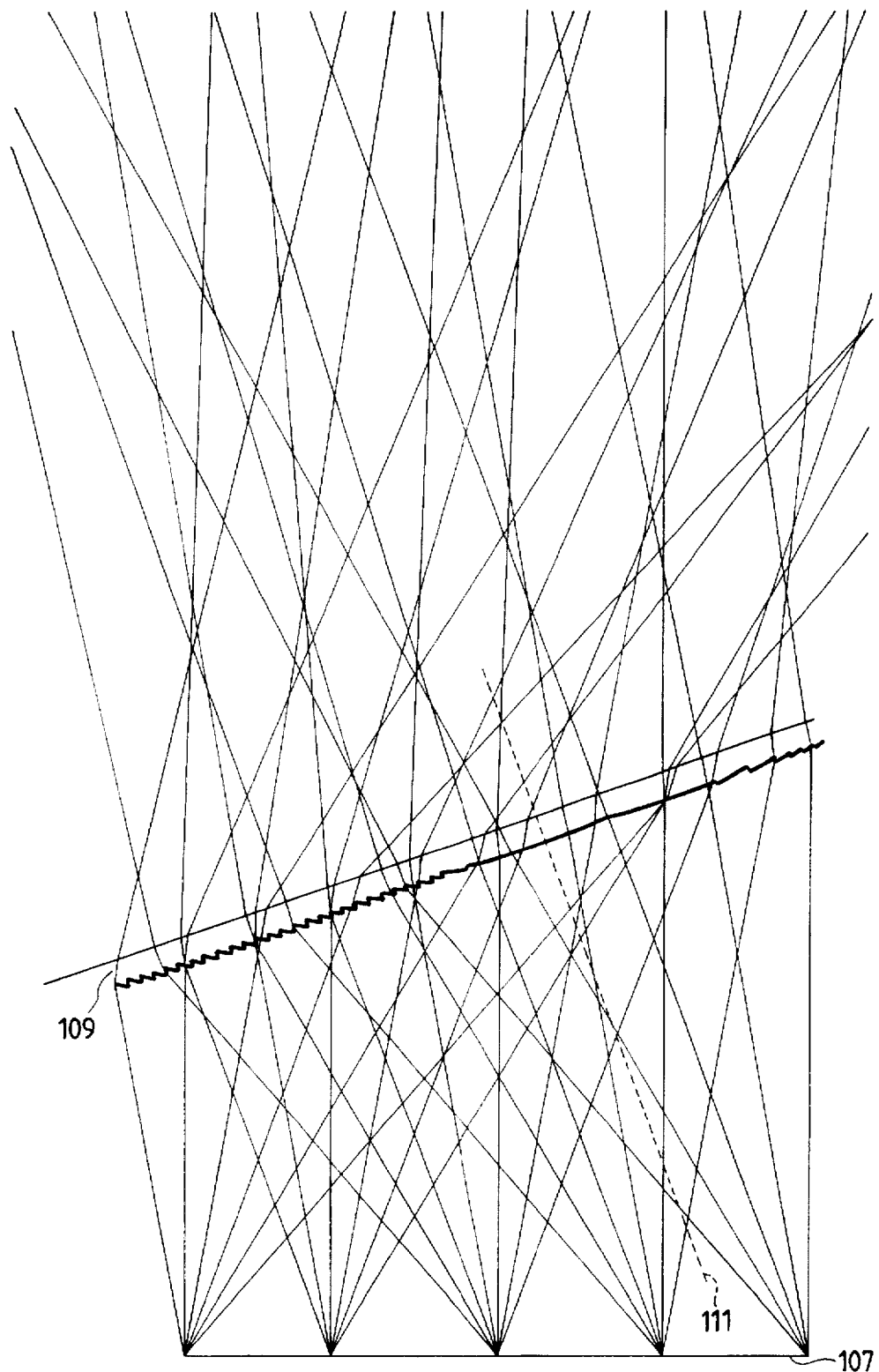
FIG. 20 shows the optical path at the telephoto end of the first embodiment.
Figure 21A:
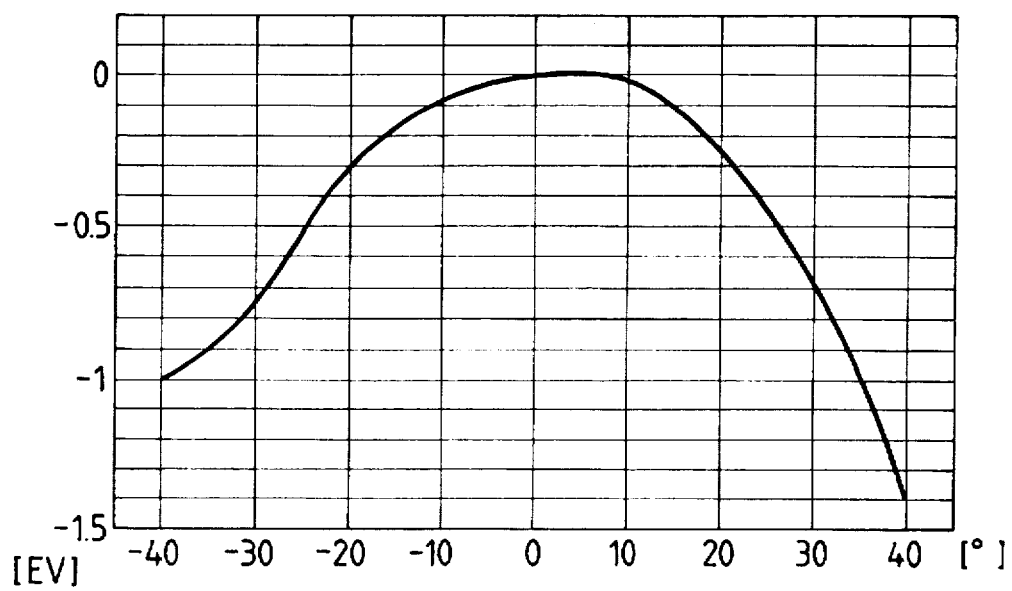
FIGS. 21A and 21B are graphs showing the illumination characteristics of the first embodiment at the wide angle end and the telephoto end, respectively.
Figure 21B:
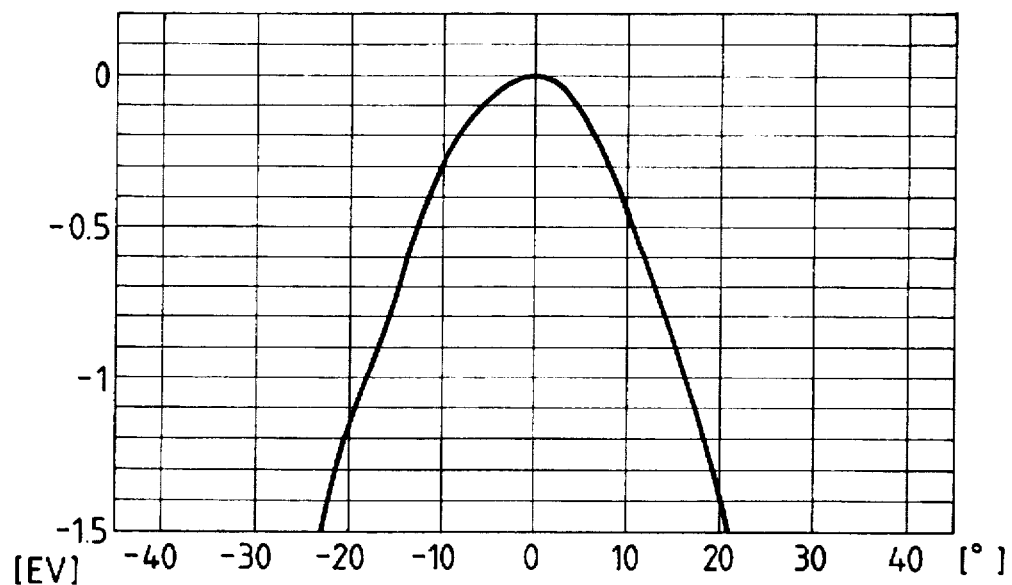

FIGS. 19 and 20 show the optical paths at the wide angle end and the telephoto end, respectively, in the first embodiment. FIGS. 21A and 21B show the illumination characteristics at the wide angle end and the telephoto end, respectively, in the first embodiment.

In the first embodiment, the lens optical axis 211 of the Fresnel lens 209 is inclined with respect to the fiducial optical axis 214 and therefore, in FIGS. 21A and 21B, there are shown the illumination characteristics in the lengthwise direction of the xenon tube. In FIGS. 21A and 21B, the angle formed with respect to the fiducial optical axis 214 when a light beam has emerged from the Fresnel lens 209 is shown as the axis of abscissas and a relative intensity distribution is shown as the axis of ordinates. FIG. 21A shows the illumination characteristic at the wide angle end, and FIG. 21B shows the illumination characteristic at the telephoto end.

As shown in FIGS. 21A and 21B, good illumination characteristics are obtained in the present embodiment. Accordingly, when the present embodiment is applied to the illuminating optical system of a camera, the photographing range of a photo-taking lens can be illuminated well from the wide angle end to the telephoto end.

Figure 22A:
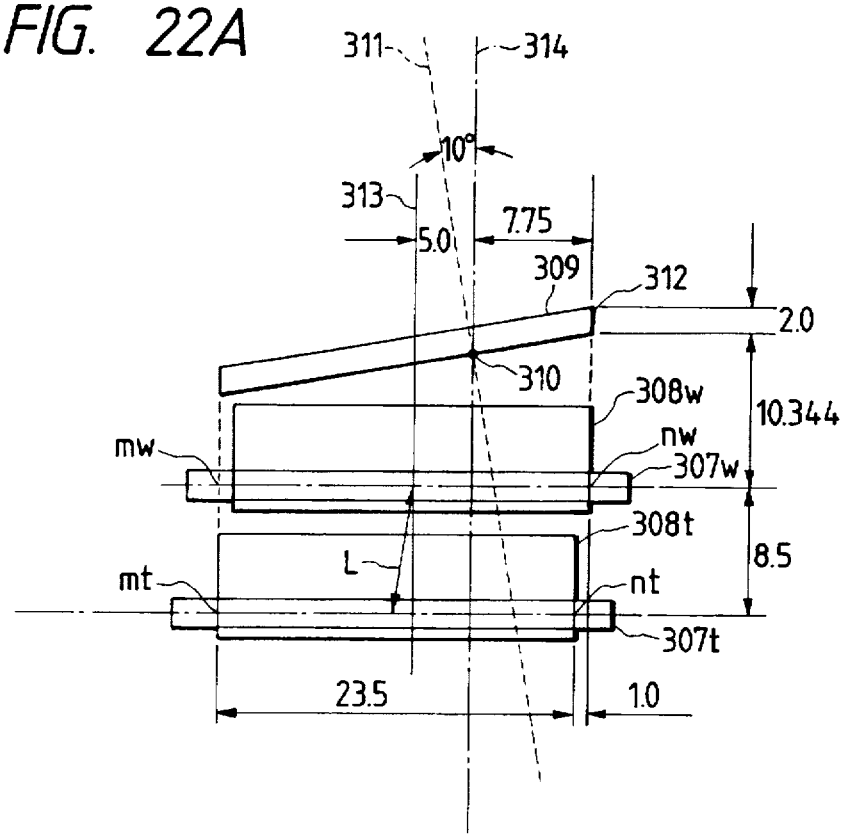
FIGS. 22A and 22B are cross-sectional views showing the optical arrangement of an illuminating optical system according to a second embodiment of the present invention, FIG. 22A being a cross-sectional view along a plane containing the lengthwise axis of a xenon tube 307 and a fiducial optical axis 314, and FIG. 22B being a cross-sectional view along a plane perpendicular to the lengthwise axis of the xenon tube 307.
Figure 22B:
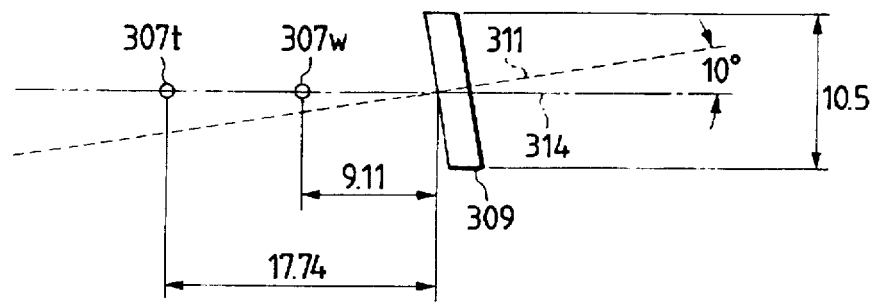

FIGS. 22A and 22B are cross-sectional views showing the optical arrangement of an illuminating optical system according to a second embodiment of the present invention. FIG. 22A is a cross-sectional view along a plane containing the lengthwise axis of a xenon tube 307 and a fiducial optical axis 314, and FIG. 22B is a cross-sectional view along a plane perpendicular to the lengthwise axis of the xenon tube 307.

In FIGS. 22A and 22B, the center axis of the configuration 312 of a Fresnel lens 309 is designated by the reference numeral 313. Also, the point of intersection between the lens optical axis 311 of the Fresnel lens 309 and the Fresnel lens 309, i.e., the lens center, is denoted by the reference numeral 310. An axis 314 indicates a fiducial optical axis parallel to the optical axis 104 of a photo-taking lens 103 and passing through the lens center 310.

Also, m and n designate the points at the opposite ends of the xenon tube 307. The suffixes w and t of the xenon tube 307, a reflector 308 and the points m and n indicate a state in which the illumination range at a predetermined distance is widest, i.e., the wide angle end, and a state in which said illumination range is narrowest, i.e., the telephoto end, respectively.

As shown in FIG. 22A, in the second embodiment, the configuration center axis 313, the fiducial optical axis 314 and the xenon tube 307 lie on the same plane. In a plane containing the lengthwise axis of the xenon tube 307 and the fiducial optical axis 314, the lens optical axis 311 and the fiducial optical axis 314 form an angle of 10° therebetween. Also, in a plane perpendicular to the lengthwise axis of the xenon tube 307 and containing the fiducial optical axis 314, the lens optical axis 311 and the fiducial optical axis 314 form an angle of 10° therebetween. Further, the xenon tube 307 extends perpendicularly to the fiducial optical axis 314, and moves away from the Fresnel lens 309 along the fiducial optical axis 314 while shifting relative to the fiducial optical axis 314 in a plane containing the configuration center 313 and the fiducial optical axis 314, during the change of the irradiation angle from the wide angle end to the telephoto end.

Figure 23:
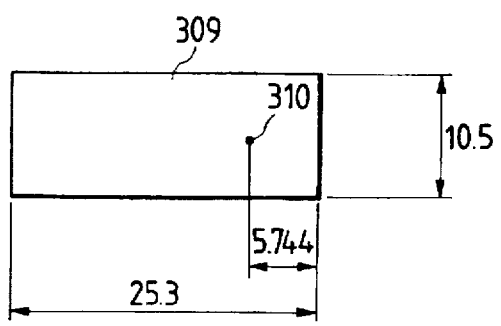
FIG. 23 is a view of the configuration 312 of a Fresnel lens 309 in FIG. 22A as it is seen from the direction of a lens optical axis 311.

In the second embodiment, the configuration 312 of the Fresnel lens 309, when viewed from the direction of the lens optical axis 311, is a rectangular shape having a dimension as shown in FIG. 23. That surface of the Fresnel lens 309 which is adjacent to the illumination range is formed into a flat surface shape perpendicular to the lens optical axis 311, and that surface of the Fresnel lens 309 which is adjacent to the xenon tube 307 is formed into a Fresnel surface shape.

The numerical data of the Fresnel surface of the Fresnel lens 309 are shown in Table 2 below. In Table 2, h indicates the distance from the optical axis 311 of the lens, and σ (degrees) indicates the angle formed between the lens optical axis and the normal direction of each Fresnel element, i.e., the Fresnel angle.

TABLE 2

| h [mm] | σ (degrees) |
|---|---|
| 0.5 | 0.00 |
| 1.5 | 0.25 |
| 2.5 | 1.73 |
| 3.5 | 2.68 |
| 4.5 | 3.48 |
| 5.5 | 5.99 |
| 6.5 | 9.41 |
| 7.5 | 14.12 |
| 8.5 | 23.97 |
| 9.5 | 26.22 |

TABLE 2-continued

| h [mm] | σ (degrees) |
|---|---|
| 10.5 | 33.35 |
| 11.5 | 35.36 |
| 12.5 | 40.25 |
| 13.5 | 42.04 |
| 14.5 | 43.72 |
| 15.5 | 45.32 |
| 16.5 | 43.86 |
| 17.5 | 45.47 |
| 18.5 | 45.50 |
| 19.5 | 46.50 |
| 20.5 | 47.10 |
| 21.5 | 47.50 |

Again in the second embodiment, it is verified that a good illumination characteristic is obtained as in the first embodiment.

Also, in the above-described second embodiment, the xenon tube parallel-moves at the wide angle end and the telephoto end and the xenon tube is shifted relative to the fiducial optical axis to thereby correct the one-sidedness of the illumination range. Of course, however, it is possible to incline the xenon tube so as not to be parallel to each other at the wide angle end and the telephoto end, thereby correcting the one-sidedness of the illumination range.

While in the above-described embodiments, a xenon tube is used as the light emitting source, use can also be made of other suitable light emitting source such as a halogen lamp or an LED.

As described above, according to the present invention, there can be achieved a variable irradiation angle illuminating optical system which can well illuminate the photographing range of a photo-taking lens even if the front face of a camera is made into a shape giving priority to design.

What is claimed is:

1. An illuminating optical system including:

light emitting means for supplying illuminating light;

directing means for directing the light beam from said light emitting means by refracting action; and moving means for moving at least one of said light emitting means and said directing means in a direction differing from the direction of the optical axis of said directing means and varying the spacing between said light emitting means and said directing means to thereby vary the illumination range at a predetermined distance.

2. An illuminating optical system according to claim 1, wherein said moving means moves said light emitting means in the direction differing from the direction of the optical axis of said directing means to thereby vary the illumination range at said predetermined distance.

3. An illuminating optical system according to claim 1, wherein said directing means has at least one Fresnel lens, and the center of the optical axis of said directing means shifts relative to the configuration center axis of said directing means to correct the one-sidedness of the illumination range due to the inclination of said directing means.

4. An illuminating optical system according to claim 1, wherein said light emitting means is a xenon tube.

5. An illuminating optical system according to claim 1, further including:

reflecting means provided on a side opposite to the side of said directing means with respect to said light emitting means for reflecting a part of the light beam from said light emitting means toward said directing means.

6. An illuminating optical system according to claim 1, wherein the irradiation range at said predetermined distance becomes narrower as the spacing between said light emitting means and said directing means becomes greater, and when a state in which the illumination range is widest is defined as a wide angle end and a state in which the illumination range is narrowest is defined as a telephoto end, said moving means rectilinearly moved said light emitting means between the position at said wide angle end and the position at said telephoto end when said illumination range varies.

7. An illuminating optical system according to claim 1, wherein the shift amount of said light emitting means relative to the optical axis of said directing means varies when the illumination range at said predetermined distance varies.

8. An illuminating optical system including:

a light source for supplying illuminating light; and a Fresnel lens for directing the light beam from said light source in a predetermined direction;

wherein said light source can be moved in a direction differing from the direction of the optical axis of said Fresnel lens to thereby vary the illumination range at a predetermined position, and the center of the optical axis of said Fresnel lens shifts relative to the configuration center axis of said Fresnel lens to thereby correct the one-sidedness of the illumination range due to the inclination of said Fresnel lens.

9. An illuminating optical system according to claim 8, further including:

a reflecting member provided on a side opposite to the side of said Fresnel lens with respect to said light source for reflecting a part of the light beam from said light source toward said Fresnel lens.

10. An illuminating optical system according to claim 8, wherein said light source is rectilinearly moved relative to said Fresnel lens, and the illumination range at the predetermined position becomes narrower as the spacing between said light source and said Fresnel lens becomes wider.

* * * * *